(12) United States Patent
Cappelle et al.

(10) Patent No.: US 10,781,144 B2
(45) Date of Patent: Sep. 22, 2020

(54) PROCESS AND DEVICE FOR PROCESSING AN INORGANIC NUTRITIVE IRON COMPOSITION

(71) Applicant: PRAYON SA, Engis (BE)

(72) Inventors: Philippe Jacques Cappelle, Esneux (BE); Kurt Thierry Verhelst, Oud-Turnhout (BE); Isabelle Didderen, Warsage (BE)

(73) Assignee: PRAYON SA, Engis (BE)

( * ) Notice: Subject to any disclaimer, the term of this patent is extended or adjusted under 35 U.S.C. 154(b) by 103 days.

(21) Appl. No.: 15/579,544

(22) PCT Filed: Jun. 14, 2016

(86) PCT No.: PCT/EP2016/063639
§ 371 (c)(1),
(2) Date: Dec. 4, 2017

(87) PCT Pub. No.: WO2016/202803
PCT Pub. Date: Dec. 22, 2016

(65) Prior Publication Data
US 2018/0148385 A1 May 31, 2018

(30) Foreign Application Priority Data
Jun. 15, 2015 (BE) .................................. 2015/5363

(51) Int. Cl.
*C05D 9/02* (2006.01)
*A01C 23/04* (2006.01)
(Continued)

(52) U.S. Cl.
CPC .............. *C05D 9/02* (2013.01); *A01C 23/042* (2013.01); *C05B 7/00* (2013.01); *C05B 13/04* (2013.01); *C05B 13/06* (2013.01)

(58) Field of Classification Search
CPC ......... C05B 17/02; C05B 17/00; C05B 13/06; C05B 13/04; C05B 7/00; A23L 33/10;
(Continued)

(56) References Cited

U.S. PATENT DOCUMENTS

| 4,145,208 A | 3/1979 | Gulko et al. |
| 8,690,982 B1 | 4/2014 | Miller et al. |
| 2015/0259258 A1 | 9/2015 | Cappelle et al. |

FOREIGN PATENT DOCUMENTS

| DE | 2729417 A2 | 7/1978 |
| WO | 9528369 A1 | 10/1995 |
| WO | 2014056688 A1 | 4/2014 |

OTHER PUBLICATIONS

Kessler, David. "Airing out the Truth on Dissolved Oxygen in Hydroponics". Just4Growers Indoor Gardening and Plants; Hydroponic Growing Techniques. <http://www.just4growers.com/stream/hydroponic-growing-techniques/airing-out-the-truth-on-dissolved-oxygen-in-hydroponics.aspx> Nov. 21, 2013.*

(Continued)

*Primary Examiner* — Jennifer A Smith
(74) *Attorney, Agent, or Firm* — Christensen O'Connor Johnson Kindness PLLC

(57) ABSTRACT

Plant fertirrigation method comprising the formation of a series of mother solutions, the feeding of each of the mother solutions into a dilution system in order to form a fertirrigation solution, the supply to a fertirrigation device by means of a transfer device, supplying said fertirrigation device with said fertirrigation solution, and an addition of iron and of at least one polyphosphate.

16 Claims, 5 Drawing Sheets

(51) Int. Cl.
C05B 13/04 (2006.01)
C05B 13/06 (2006.01)
C05B 7/00 (2006.01)

(58) Field of Classification Search
CPC ......... A23L 33/165; A23K 20/30; B01F 3/18; B01F 1/0005; B01F 2215/0055; C05D 9/02; A01C 23/042
See application file for complete search history.

(56) References Cited

OTHER PUBLICATIONS

Sela, Guy. "pH Adjustment in Fertigation". Smart! Growing Intelligently. <http://www.smart-fertilizer.com/articles/pH-in-fertigation> Nov. 9, 2014.*
Argus Controls. "Multi-Feed Nutrient Injection". <http://www.arguscontrols.com/system/multi-feed-nutrient-injection/> pp. 1-4 Aug. 29, 2014.*
International Search Report dated Sep. 15, 2016, issued in corresponding International Application No. PCT/EP2016/063639, filed Jun. 14, 2016, 3 pages.
Written Opinion of the International Searching Authority dated Sep. 15, 2016, issued in corresponding International Application No. PCT/EP2016/063639, filed Jun. 14, 2016, 6 pages.
Written Opinion of the International Searching Authority dated Sep. 15, 2016, issued in corresponding International Application No. PCT/EP2016/063639, filed Jun. 14, 2016, 5 pages.
International Preliminary Report on Patentability dated Dec. 19, 2017, issued in corresponding International Application No. PCT/EP2016/063639, filed Jun. 14, 2016, 1 page.

* cited by examiner

PROCESS AND DEVICE FOR PROCESSING AN INORGANIC NUTRITIVE IRON COMPOSITION

The present invention relates to a method for using a nutritive inorganic iron composition and a corresponding device for the fertirrigation of plants.

Whether for human, animal, plant or microorganism nutrition, the assimilation of minerals (macro- and micronutriments) is essential to the life cycles of these various organisms.

This is because it is known that macronutriments (carbon, hydrogen, oxygen, nitrogen, potassium, sodium, calcium, magnesium, phosphorus and sulphur) must be present in optimum quantities for plants to develop in an optimum fashion. Micronutriments or oligoelements, present in lower concentrations than those of macronutriments in plants, are for example chlorine, iron, boron, manganese, zinc, copper, nickel and molybdenum and are also very important. If one or other of these micronutriments is lacking or is present in an excessively low concentration, deficiency ailments may result therefrom, having a direct impact on the growth of the plants and therefore on the yield of the cultivations.

In addition, in order to be able to be absorbed and assimilated, these nutritive elements must essentially be bioavailable, that is to say be able to be completely solubilised in a solution from which these organisms can take and assimilate them.

Among these micronutriments, iron is the one of which the plant requires the highest concentration (around 100 mg/kg of dry tissue), this element being necessary for the synthesis of chlorophyll, which is itself essential for photosynthesis, which is directly related to the growth and "survival" of the plants.

However, iron is a micronutriment that is well known for being an element that is particularly difficult to solubilise. One of the methods used for solubilising iron lies in chelating it by means of synthetic organic chelates. However, these chelating agents are becoming more and more controversial since they are not biodegradable and in particular promote the resolubilisation of heavy metals in surface water.

It is therefore for this reason that nutritive compositions based on inorganic iron have been developed (see for example the international patent applications WO 2014/056690 and WO 2014/056688), these compositions contain at least one source of iron and a polyphosphate.

At the present time, horticulturists or farmers are making greater and greater use of the technique of fertirrigation, which makes it possible to optimise the additions of water and nutriments efficiently and ecologically. However, in a fertirrigation system, it is essential for the minerals to be entirely solubilised in the irrigation solution in order to be present in the form of dissolved ions that can be assimilated by the plants, since minerals in solid form cannot be assimilated by plants.

Current fertirrigation methods comprise typically the formation of one or more mother solutions by dissolving solid fertilisers or by mixing/diluting liquid fertilisers, feeding each of these mother solutions into the irrigation water, either in a dilution tank or directly in the irrigation line, in order to form a fertirrigation solution, and supplying a fertirrigation device (such as a drip device) by means of a transfer device that supplies the fertirrigation device with said fertirrigation solution. This device then regularly supplies the plants cultivated hydroponically or on substrates or in open ground or aeroponically or for the nutritive film technique.

Such methods and devices are described in the documents DE2729417 and U.S. Pat. No. 8,690,982, in which phosphoric acid is added as a nutriment.

When horticulturists decide to opt for alternatives without organic iron chelates and to use inorganic nutritive compositions based on iron, it is therefore typically necessary to introduce this iron source into a mother solution of chosen composition and then to inject said mother solution into the irrigation solution. Various implementation methods can thus be proposed.

It is possible for example to envisage injecting the nutritive composition in aqueous phase of the patent application WO2014/056690, as it stands or diluted with water, directly into the irrigation solution, said nutritive composition then itself serving as the mother solution. The same type of mother solution can be obtained by dissolving the solid nutritive composition of the application WO2014/056688 in water separately from the other fertilisers. Another possibility consists of introducing the inorganic nutritive compositions based on solid or liquid iron into one of the mother solutions already used for providing the other nutritive elements needed by the plants.

Unfortunately, such a use of said inorganic nutritive compositions based on iron gives rise to problems with many horticulturists. A chemical precipitation phenomenon very often appears during the step of feeding the mother solution containing said iron source into the irrigation solution. The solid phase formed, which is composed mainly of calcium phosphate, at the same time entrains a large quantity of iron, which is therefore lost.

This precipitation phenomenon consequently causes iron deficiencies and also results in problems of fouling and even sometimes blocking of the devices used for metering and injecting said mother solution into the irrigation solution, or even into the fertirrigation solution. The blocking phenomenon is particularly significant in the case of the venturi system normally used by horticulturists for metering the mother solutions and where part of the irrigation solution containing calcium is normally used as the aspiration liquid. The blocking of the venturi device may go as far as causing complete stoppage of the metering of iron if the problem is not detected in time, the consequences then being dramatic for the cultivation.

In diagnosing the problem in depth, it is also found that the precipitate, once formed, has difficulty in resolubilising in the irrigation solution, even when the pH of the latter is situated in the range normally recommended in fertirrigation (pH 5.5-5.8). The residence time of said solution in the mixing tank (when such exists) is thereby insufficient to resorb said precipitate. Any storage tanks for the irrigation solution and the irrigation line downstream of said mixing tank are also insufficiently agitated so that the solubilisation of the precipitate can continue therein.

This precipitation problem is clearly related to the basic pH of the mother solutions that are obtained naturally at the start of said inorganic nutritive compositions based on iron. As indicated by claim 12 of the patent application WO2014/056690, the preferred pH range of the nutritive composition in aqueous phase extends from 7 to 10.8, giving optimum stability in storage of the solution.

Moreover, as shown by examples 1 and 2 of the patent application WO2014/056688, the solid nutritive composition also provides typically basic pHs after it is put in solution in water. It is possible to reduce the pH of said mother solutions by adding thereto a certain quantity of acid, but at the present time it is not obvious whether there exists a pH range for said mother solutions making it possible to avoid the precipitation problem described above without creating other difficulties. In reducing the pH of the mother solution containing said source of iron, there is a tendency in fact to reduce its stability in storage, for two different reasons.

First of all, the protonation reaction that polyphosphates undergo when the pH of the solution is decreased generally reduces their chelating capability vis-à-vis metallic cations such as iron.

Moreover, it is also well known that reducing pH increases the rate of hydrolysis of polyphosphates, the disappearance of which causes precipitation of iron. However, the mother solutions in question must be able to be stored for several weeks without undergoing precipitation at a storage temperature that may range up to 40° C. in the greenhouses of horticulturists, knowing that this high temperature further accelerates the hydrolysis of polyphosphates.

The chemical stability data available to us for irrigation solutions cannot be extrapolated to the case of mother solutions that are typically 100 to 10,000 times more concentrated and the storage times of which are much longer than those of irrigation solutions, the consumption time of which rarely exceeds 1 or 2 days.

The aim of the invention is to overcome these drawbacks of the prior art by procuring a method for the optimum use of iron and at least one polyphosphate in fertirrigation devices.

To solve this problem, a method for the fertirrigation of plants is provided according to the invention, comprising making available a series of mother solutions, feeding each of the mother solutions into a dilution system, in order to form a fertirrigation solution, supplying a fertirrigation device by means of a transfer device, and supplying said fertirrigation device with said fertirrigation solution.

This method is characterised in that the method further comprises an addition of iron and at least one polyphosphate to an aqueous phase with formation of at least one iron solution and at least one polyphosphate at a pH of between 4.5 and 6.2, advantageously greater than or equal to 5.0 and less than or equal to 6.0, preferably a pH greater than equal to 5.5.

By studying the stability of said solutions according to their pH, and then testing the novel method of use according to the invention in all kinds of configurations, including venturi devices functioning with recycling of the irrigation solution, it was shown surprisingly that the aforementioned pH range makes it possible to avoid the precipitation problem that was encountered by feeding one or more mother solutions into the irrigation solution while keeping sufficient stability in storage of the series of mother solutions itself.

Furthermore, said pH range is sufficiently wide to ensure the robustness of the method of use according to the present invention despite the numerous parameters that are capable of influencing the pH of the series of mother solutions or of the fertirrigation solution and disturbing their adjustment: the concentrations in the series of mother solutions, of the fertirrigation solution, the possible buffer effect of the other constituents and the various metering errors that may occur, in particular with regard to the acid added or left in excess for reducing the pH of the solution. These errors may be particularly great in the case of liquid fertilisers, where it is often a case of neutralising basic solutions with other acid solutions and where a small excess of one or other solution may create significant divergences in pH.

In a particular embodiment of the fertirrigation method according to the present invention, one of said at least one iron solution and at least one polyphosphate at a pH of between 4.5 and 6.2, advantageously greater than or equal to 5.0, and less than or equal to 6.0, preferably a pH greater than or equal to 5.5, is a mother solution in said series of mother solutions.

This is because, according to the present invention, the aforementioned pH range in the mother solution into which the iron and said at least one polyphosphate are fed makes it possible to avoid the precipitation problem that would be encountered in feeding the mother solution into the irrigation solution while keeping sufficient stability in storage of the solution.

In a variant of the method according to the present invention, although according to what is mentioned above the precipitation problem described above tends to exclude any other method of use that would supply a basic mother solution comprising iron, provision is also made for said at least one solution of iron and at least one polyphosphate at a pH of between 4.5 and 6.2, advantageously greater than or equal to 5.0 and less than or equal to 6.0, preferably a pH greater than or equal to 5.5, to be a solution of iron and at least one polyphosphate at a pH of between 4.5 and 6.2, advantageously greater than or equal to 5.0 and less than or equal to 6.0, preferably a pH greater than or equal to 5.5, preferably less than or equal to 5.8, and to be the fertirrigation solution.

This is because the least exceeding of the pH above 6.2, even localised at the point of feeding of said mother solution into the irrigation solution, appears to be sufficient to cause the problem in the light of the persistence of the precipitate once formed.

However, surprisingly, it has been shown in the variant of the method according to the invention that the precipitation phenomenon in question may be despite everything avoided, for example by providing a sufficiently rapid dispersion of said basic mother solution comprising iron at the point of supply and metering a sufficient quantity of acid upstream of the supply point so that the resulting mixture is below pH 6.2, preferably below pH 6.0 and preferentially below pH 5.8.

A dispersion turbine or any other intensive mixing appliance, whether it be static or dynamic, may be installed in the mixing tank or in the irrigation line with a view to creating the necessary dispersion effect at the point of supply. Another embodiment of this alternative implementation method consists of choosing a supply point in the mixing tank having sufficiently intensive mixing conditions.

The suitability of the mixing conditions at the point of supply can be checked by measuring the solubilised iron content in accordance with the analysis method described in the patent applications mentioned above.

The present invention therefore also procures a method for using basic mother solutions comprising iron and at least one polyphosphate that does not require bringing said mother solutions into the pH range claimed above.

Preferably, in the method according to the present invention, said addition of iron and at least one polyphosphate is implemented by supplying, separately or together, a source of iron and a source of at least one phosphate, each source being, independently of each other, in solid, solution or suspension form.

In another preferential embodiment of the present invention, said addition of iron and at least one polyphosphate is implemented by supplying a composition containing iron and at least one polyphosphate, in solid, solution or suspension form.

In a variant of the method according to the present invention, said at least one addition of iron and at least one polyphosphate to an aqueous phase with formation of at least one solution of iron and of at least one polyphosphate at a pH of between 4.5 and 6.2, advantageously greater than or equal to 5.0 and less than or equal to 6.0, preferably a pH greater than or equal to 5.5, is an addition of a presolution of iron and of at least one polyphosphate to a mother solution, which forms the solution of iron and at least one polyphosphate at a pH of between 4.5 and 6.2, advantageously greater than or equal to 5.0 and less than or equal to 6.0, preferably a pH greater than or equal to 5.5.

In another variant of the method according to the present invention, said at least one solution of iron and of at least one polyphosphate at a pH of between 4.5 and 6.2, advantageously greater than or equal to 5.0 and less than or equal to 6.0, preferably a pH greater than or equal to 5.5, is a solution of iron and of at least one polyphosphate at a pH of between 4.5 and 6.2, advantageously greater than or equal to 5.0 and less than or equal to 6.0, preferably a pH greater than or equal to 5.5, added to at least one mother solution of said series of mother solutions.

Advantageously, in the method according to the present invention, said at least one mother solution of said series of mother solutions containing iron and at least one polyphosphate also contains ions chosen from the group consisting of sulphates, phosphates of any type, nitrates, chlorides, potassium, ammonium, sodium and mixtures thereof.

According to a preferred embodiment of the present invention, said at least one mother solution of said series of mother solutions containing iron and at least one polyphosphate does not contain a magnesium ion.

According to yet another embodiment, the iron and said at least one polyphosphate are added to an aqueous phase in order to form a mother presolution comprising iron and at least one polyphosphate, said mother presolution comprising iron and at least one polyphosphate then being added to another aqueous phase in order to form said at least one solution of iron and at least one polyphosphate at a pH of between 4.5 and 6.2, advantageously greater than or equal to 5.0 and less than or equal to 6.0, preferably a pH greater than or equal to 5.5.

More particularly again, in the method according to the present invention, said at least one mother solution of said series of mother solutions or said mother presolution containing iron and at least one polyphosphate contains micronutriments selected from the group consisting of boron, manganese, zinc, copper, molybdenum, cobalt and mixtures thereof, preferably in an atomic ratio with respect to Fe of between 0.1 and 5 for B, 0.05 and 2.5 for Mn, 0.01 and 1 for Zn, 0.005 and 0.25 for Cu and Mo and between 0.001 and 0.1 for Co.

Advantageously, in the plant fertirrigation method according to the present invention, the pH of said mother solution or of one of said mother solutions or of said mother presolution or of the fertirrigation solution containing iron and at least one polyphosphate is adjusted by adding an acid chosen from the group consisting of mineral acids, such as for example nitric acid, sulphuric acid, phosphoric acid and mixtures thereof.

Advantageously, said fertirrigation solution has a molar concentration, expressed in millimoles/litre (mM) of phosphorus (P), of between 0.05 and 5 mM, preferentially between 0.5 and 3 mM, advantageously between 1 and 2 mM.

The method according to the present invention comprises, according to a preferred embodiment, oxidation of said at least one solution of iron and at least one polyphosphate and/or of said mother presolution containing iron and at least one polyphosphate.

By way of example, the oxidation treatments normally used are: bubbling with air by means of a disperser situated at the bottom of the vessel (the air being able to come from a compressor or a simple pump), agitation on the surface of the liquid under air, addition of oxidants such as oxygen, air, hydrogen peroxide, Javel water, etc.

The duration of the oxygen treatment varies between a few hours and several days depending on the size of the vessel and the aeration system used.

In yet another advantageous variant of the method according to the invention, the iron and said at least one polyphosphate are added in a $P_{poly}$/Fe ratio of between 5 and 50, preferably between 8 and 32, where Fe represents the total number of moles of iron and $P_{poly}$ represents the number of phosphorus moles in the form of polyphosphate.

More particularly, in the method according to the present invention, said at least one polyphosphate comprises potassium tripolyphosphate, and/or tetrapotassium pyrophosphate, and/or potassium tripolyphosphate, and/or sodium tripolyphosphate, and/or sodium acid pyrophosphate, and/or tetrasodium pyrophosphate, and/or ammonium pyrophosphate, and/or ammonium polyphosphate, or mixtures thereof.

More particularly, in said solution of iron and at least one polyphosphate, the P ortho/P total molar ratio, with P ortho the number of moles of P in ortho form and P tot the total number of moles of P, lies between 0 and 0.95, preferably 0 to 0.3.

In a particularly preferred embodiment, each step of feeding each of the mother solutions into the dilution system is a step of transfer by venturi entrainment of said mother solution by means of a flow of fertirrigation solution diverted to the discharge of said transfer device that makes it possible to supply the fertirrigation device in which the pH of the fertirrigation system is less than 6.2.

Advantageously, and more particularly when the iron and said at least one polyphosphate are added to the fertirrigation solution, said fertirrigation solution is at a pH of below 6.0 and preferably below 5.8.

Preferably, in this case, the iron and said at least one polyphosphate are added to said fertirrigation solution at a feed point having mixing conditions that are sufficiently intense with a view to avoiding any precipitation.

Advantageously, said mother solutions comprising iron and at least one polyphosphate have a concentration of iron of 0.15 mM to 500 mM.

Advantageously, said mother solutions comprising iron and at least one phosphate have as a constituent a solid inorganic composition containing iron and at least one polyphosphate dissolved in water or in an aqueous solution (fertirrigation solution or drainage solution) or a liquid inorganic composition comprising iron and at least one polyphosphate.

Advantageously, said mother presolutions comprising iron and at least one polyphosphate have as a constituent a solid inorganic composition containing iron and at least one polyphosphate dissolved in one of said mother presolutions or a liquid inorganic composition comprising iron and at least one polyphosphate.

Preferentially, said at least one source of iron is chosen from the group consisting of $Fe_2(SO_4)_3 \cdot xH_2O$ where x represents a molar coefficient lying between 0 and 9, $MFe(SO_4)_2 \cdot 12H_2O$ where M represents Na or K, $Fe(NO_3)_3 \cdot xH_2O$ where x represents a molar coefficient lying between 0 and 9, $FeCl_3 \cdot xH_2O$ where x represents a molar coefficient lying between 0 and 6, $Fe_4(P_2O_7)_3$, $FePO_4 \cdot xH_2O$ where x represents a molar coefficient lying between 0 and 4, $FeSO_4 \cdot xH_2O$ where x represents a molar coefficient lying between 0 and 7, $FeCl_2 \cdot xH_2O$ where x represents a molar coefficient lying between 0 and 4, $FeO \cdot xH_2O$ where x represents a molar coefficient lying between 0 and 1, $Fe(NH_4)PO_4 \cdot H_2O$, iron oxysulphate and mixtures thereof.

Advantageously, the feed water, the mother solutions or mother presolutions or the fertirrigation solutions may be filtered by any means or device normally used, such as for example sand filters, etc.

Other embodiments of the method according to the invention are indicated in the accompanying claims.

Another subject matter of the invention is a plant fertirrigation installation comprising:

a dilution system comprising an opening for feeding mother solutions and a fertirrigation solution outlet, a series of vessels for mother solutions and/or mother presolution each having an outlet manifold equipped with a transfer means and connected respectively to said feed opening of said dilution system or to said mother solution vessels, a fertirrigation device provided with manifolds arranged to supply plants with nutriments, connected to said fertirrigation solution outlet of said dilution system by means of a manifold provided with a transfer means.

The plant fertirrigation installation according to the present invention is characterised in that said installation further comprises a means for supplying iron and at least one polyphosphate as well as pH adjustment means connected to at least one vessel in said series of vessels for mother solutions and/or mother presolution or to said dilution system.

The dilution system of the present invention may be chosen from conventional dilution systems such as a dilution tank, an irrigation line, etc.

The words "said means for supplying iron and at least one polyphosphate" mean, within the meaning of the present invention, a single supply of iron and at least one polyphosphate together, supply of an iron composition and at least one polyphosphate or two or more separate supplies of an iron source and at least one polyphosphate source, the iron and said at least one polyphosphate being able to be, independently of each other, in liquid, solid or suspension form.

The term "manifold" means, within the meaning of the present invention, any type of pipe, tube, channel, etc. allowing the flow of a fluid in liquid form.

In a first embodiment of the plant fertirrigation installation according to the present invention, said series of mother solution vessels comprises a first mother solution vessel and a second mother solution vessel, said means for supplying iron and at least one polyphosphate being connected to said second vessel, which also comprises said pH adjustment means.

In a second embodiment of the plant fertirrigation installation according to the present invention, said series of mother solution vessels comprises a first mother solution vessel and a second mother solution vessel, said means for supplying iron and at least one polyphosphate being connected to a presolution vessel connected to said second vessel by means of a transfer manifold, said presolution vessel comprising said pH adjustment means.

In a third embodiment of the plant fertirrigation installation according to the present invention, said series of mother solution vessels comprises a first mother solution vessel and a second mother solution vessel, said means for supplying iron and at least one polyphosphate being connected to a presolution vessel connected to said second vessel by means of a transfer manifold, said second vessel comprising said pH adjustment means.

In the first or second or third embodiment according to the present invention, said second vessel or said presolution vessel advantageously further comprises oxidation means chosen in particular from agitation, a bubbling/splashing device, an aeration device, an addition of known oxidants such as air, oxygen, hydrogen peroxide, Javel water, etc.

In the first or second or third embodiment according to the present invention, said second vessel or said presolution vessel advantageously comprises agitation devices: agitators, bubbling devices, solution recycling, etc.

In a fourth embodiment of the plant fertirrigation installation according to the present invention, said series of mother solution vessels comprises a first mother solution vessel, a second mother solution vessel and a third mother solution vessel, said means for supplying iron and at least one polyphosphate being connected to said third vessel, which also comprises said pH adjustment means.

Advantageously, in the fourth embodiment, said third vessel further comprises oxidation means chosen from agitation, a bubbling device, an aeration device, an addition of oxidants such as oxygen, air, hydrogen peroxide, Javel water, etc.

Advantageously, in the fourth embodiment, said dilution system comprises an agitation means in said third mother solution. This agitation means being able to be chosen from conventional agitation means such as agitators, recycling, gas bubbling, etc.

In a fifth embodiment, said series of mother solution vessels comprises a first mother solution vessel, a second mother solution vessel and a third mother solution vessel, said means for supplying iron and at least one polyphosphate being connected to said third vessel, said pH adjustment means being connected to said dilution system or to one of said first or second mother solution vessels.

Advantageously, in the fifth embodiment, said dilution system comprises an agitation means at the point 16 of injecting said third mother solution. This agitation means being able to be chosen from conventional agitation means such as agitators, recycling, gas bubbling, etc.

Other embodiments of the fertirrigation installation according to the invention are indicated in the accompanying claims.

Other features, details and advantages of the invention will emerge from the description given below by way of non-limitative example and with reference to the drawings and to the examples.

In the drawings, FIG. 1 depicts schematically a form of implementation of the first embodiment of the installation and method according to the present invention.

In the figures, the identical or similar elements bear the same references.

Figure 1:
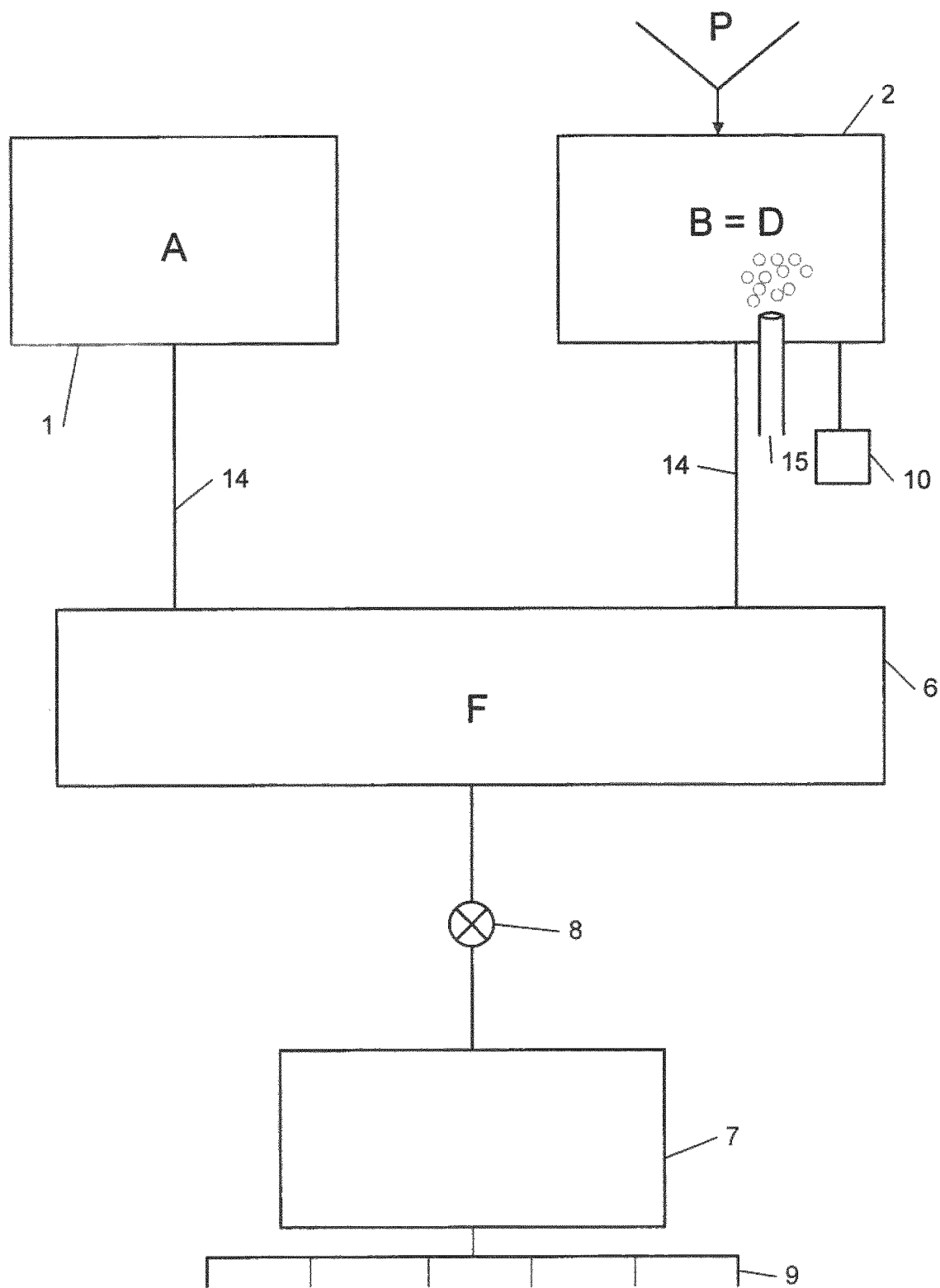

The plant fertirrigation method according to the present invention comprises making available a series of mother solutions A, B, . . . in a series of mother solution vessels 1, 2, . . . , feeding each of the mother solutions (A, B, . . . ) into a dilution system 6, in order to form a fertirrigation solution F, supplying a fertirrigation device 7 by means of at least one transfer device 8, supplying said fertirrigation device 7 with said fertirrigation solution F, adding iron and at least one polyphosphate to an aqueous phase with formation of at least one solution D of iron and at least one polyphosphate at a pH of between 4.5 and 6.2, advantageously greater than or equal to 5.0 and less than or equal to 6.0, preferably a pH greater than or equal to 5.5.

In a preferred embodiment of the invention, the method makes it possible to achieve an iron yield at the discharge from the manifolds 9 of the fertirrigation system 7 of more than 85%, preferably more than 90%. The iron yield being defined as the concentration of soluble iron measured at the discharge from the manifolds 9 of the fertirrigation system 7 (or just before the fertirrigation solution is put in contact with the substrate or substrates and the plant or plants) with respect to the theoretical iron concentration at this point. The theoretical iron concentration is calculated on the basis of the initial iron concentration (mother solution or mother presolution) and the dilution factor of the step of preparing the fertirrigation solution F.

In a first embodiment of the method according to the invention illustrated in FIG. 1, said series of mother solutions comprises a first mother solution A in a first mother solution vessel 1 and a second mother solution B in a second mother solution vessel 2, said first mother solution A comprising calcic nutriments, preferably in nitrate or chloride form, and magnesian nutriments, preferably in nitrate form, said second mother solution B comprising sulphate and phosphate anions, and mixtures thereof, as well as iron and at least one polyphosphate fed for example by a hopper P in solid form. The second mother solution B is said solution D of iron and at least one polyphosphate having a pH of between 4.5 and 6.2, advantageously greater than or equal to 5.0 and less than or equal to 6.0, preferably greater than 5.5, by adjustment thereof by the pH adjustment means 10 connected to said second vessel 2 using acid.

Naturally, depending on the fertirrigation installations present at the horticulturists or farmers and the possibility of adapting same, the method according to the invention exists according to various embodiments. The first mentioned above in fact aims to adapt the conventional method by introducing the calcic and magnesian nutriments in the first vessel, the other nutriments then being introduced in the second vessel, including iron and at least one polyphosphate.

In this embodiment, the only ions with which the inorganic nutritive composition comprising iron and at least one polyphosphate is not compatible are calcium and magnesium. The latter are isolated in the first mother solution A in the first mother solution vessel 1 while the inorganic nutritive composition is used in the second mother solution B in the second mother solution vessel 2, for example with monopotassic phosphate (MKP), potassium nitrate ($KMO_3$) or potassium sulphate ($K_2SO_4$). However, magnesium, which is often found in sulphate form in the second mother solution B in conventional methods, is now added in the form of nitrate in the first mother solution A.

The pH of the second mother solution B must be greater than 4.5 and preferably greater than 5.0 and advantageously greater than 5.5 in order to guarantee the stability of the iron during its storage time. Moreover, if the pH of this second mother solution does not exceed 6.2, any risk of precipitation in the dilution step is removed, as explained above.

The other oligoelements or micronutriments (B, Mn, Zn, Mo, Co, Cu and mixtures thereof) may be introduced either in the first mother solution A or in the second mother solution B, however, in the light of the pH conditions imposed in the second mother solution B, it will be preferred to introduce them in the first mother solution A.

Figure 2:
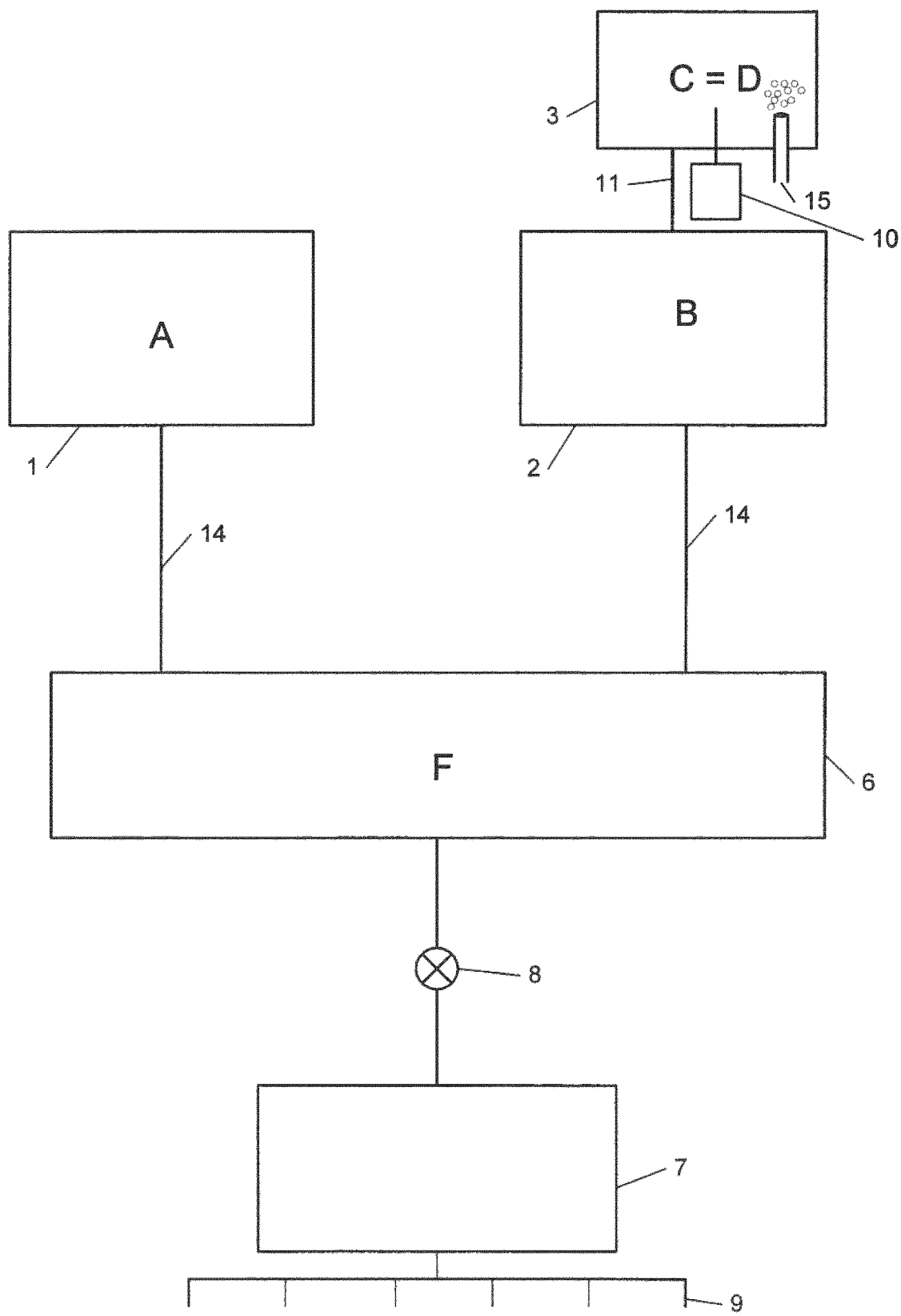
FIG. 2 depicts schematically a form of implementation of the second embodiment of the device and method according to the present invention.

In a second embodiment according to the present invention illustrated in FIG. 2, said series of mother solutions comprises a first mother solution A contained in a first mother solution vessel 1 and a second mother solution B contained in a second mother solution vessel 2. The first mother solution A comprises calcic nutrients, preferably in the form of nitrate or chloride, and magnesian nutriments, preferably in the form of a nitrate. The second mother solution B comprises sulphate and phosphate anions and mixtures thereof as well as iron and at least one polyphosphate. The iron and said at least one polyphosphate are supplied using a mother presolution C contained in a mother presolution vessel 3 to said second mother solution B in the second mother solution vessel 2 by means of a transfer manifold 11 connected firstly to the presolution vessel 3 and secondly to the second mother solution vessel 2. Means 10 for adjusting the pH are connected directly to the mother presolution vessel 3. The mother presolution C has sufficient acidity to provide a pH of between 4.5 and 6.2, advantageously greater than or equal to 5.0 and less than or equal to 6.0, preferably greater than 5.5 in said second mother solution B.

In this particular embodiment of the method according to the present invention, a mother presolution C comprising iron and at least one polyphosphate is supplied in order to be transferred subsequently in the second mother solution B in solution form. In this case, the pH of the mother presolution C will be adjusted directly by means of the addition of acid so that the pH of said second mother solution B has a pH of between 4.5 and 6.2, more particularly between 5.0 and 6.0, and preferably greater than 5.5. This can be achieved in various ways, such as for example by adjusting the pH of the mother presolution C to a predetermined pH by the means 10 for adjusting the pH so that the pH in the second mother solution B is in the required range of 4.5 and 6.2, more particularly between 5.0 and 6.0, preferably greater than 5.5. In this case, the second mother solution B is the solution of iron and at least one polyphosphate at the pH in the aforementioned required range (B=D). Another way lies in adjusting the pH also in the second mother solution B, in which case the second vessel 2 is also connected to pH adjustment means 10 (not illustrated), or by ensuring that the second mother solution B has a pH between 4.5 and 6.2, more particularly between 5.0 and 6.0, preferably greater than 5.5, as well as the mother presolution C. In the latter case, the mother presolution C is the solution D (C=D) containing iron and at least one polyphosphate at a pH between 4.5 and 6.2, more particularly between 5.0 and 6.0, preferably greater than 5.5, but also the second mother solution B (B=D).

Figure 3:
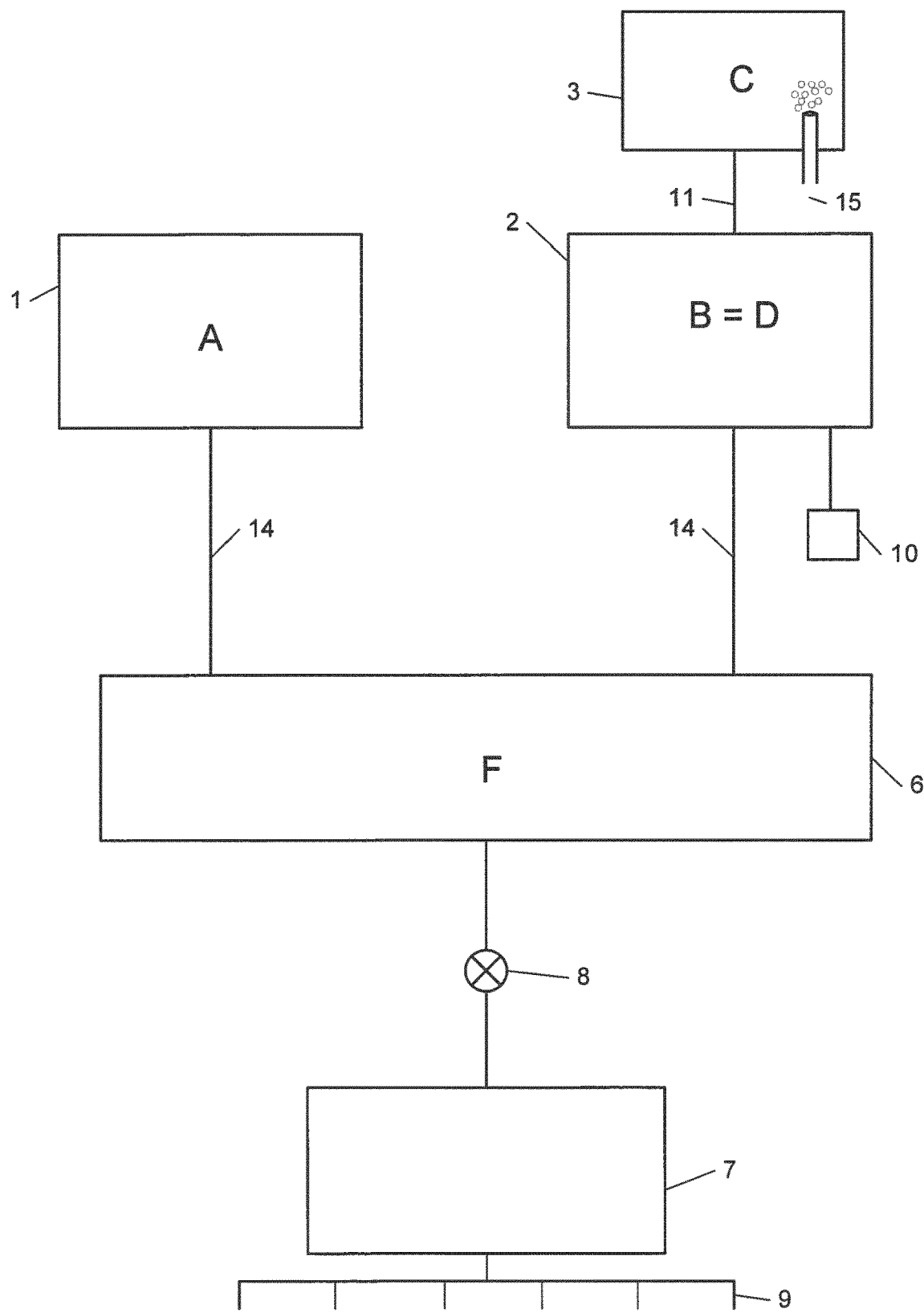
FIG. 3 depicts schematically a form of implementation of the third embodiment of the device and method according to the present invention.

In a third particular embodiment of the method according to the present invention illustrated in FIG. 3, said series of mother solutions comprises a first mother solution A in a first mother solution vessel 1 and a second mother solution B in a second mother solution vessel 2, said first mother solution A of the first mother solution vessel 1 comprising calcic nutriments, preferably in the form of nitrate and chloride, and magnesian nutriments, preferably in the form of nitrate, said second mother solution B of the second mother solution vessel comprising sulphate and phosphate anions and mixtures thereof as well as iron and at least one polyphosphate. The iron and said at least one polyphosphate are supplied from a mother presolution C contained in a presolution vessel 3 to said second mother solution B by means of a transfer manifold 11 connected firstly to the presolution vessel 3 and secondly to the second mother solution vessel 2. The pH adjustment means 10 are connected to the second mother solution vessel 2. The second mother solution B is then said solution D (B=D) of iron and at least one polyphosphate having the pH between 4.5 and 6.2, advantageously greater than or equal to 5.0 and less than or equal to 6.0, preferably greater than 5.5, by adjusting it by means of acid.

In this particular embodiment of the method according to the present invention, a mother presolution C comprising iron and at least one polyphosphate is provided in order to be transferred subsequently into the second mother solution B in solution form. In this case, the pH of the second mother solution B, in which the presolution is added, will be adjusted directly to a value between 4.5 and 6.2, advantageously greater than or equal to 5.0 and less than or equal to 6.0, more particularly greater than 5.5, by means of an addition of acid.

Advantageously, in the second and third embodiments, the mother presolution C comprises iron and at least one polyphosphate and has a $P_{poly}$/Fe ratio of between 5 and 50 and preferably between 8 and 32, where Fe represents the total number of iron moles and $P_{poly}$ represents the number of phosphorus moles in polyphosphate form.

Preferentially, in the second and third embodiments, the mother presolution C is formed from an inorganic nutritive composition based on iron and at least one solid or liquid polyphosphate.

Preferentially, in the second and third embodiments, the mother presolution C is formed from a source of iron and at least one solid or liquid polyphosphate added independently or not.

Figure 4:
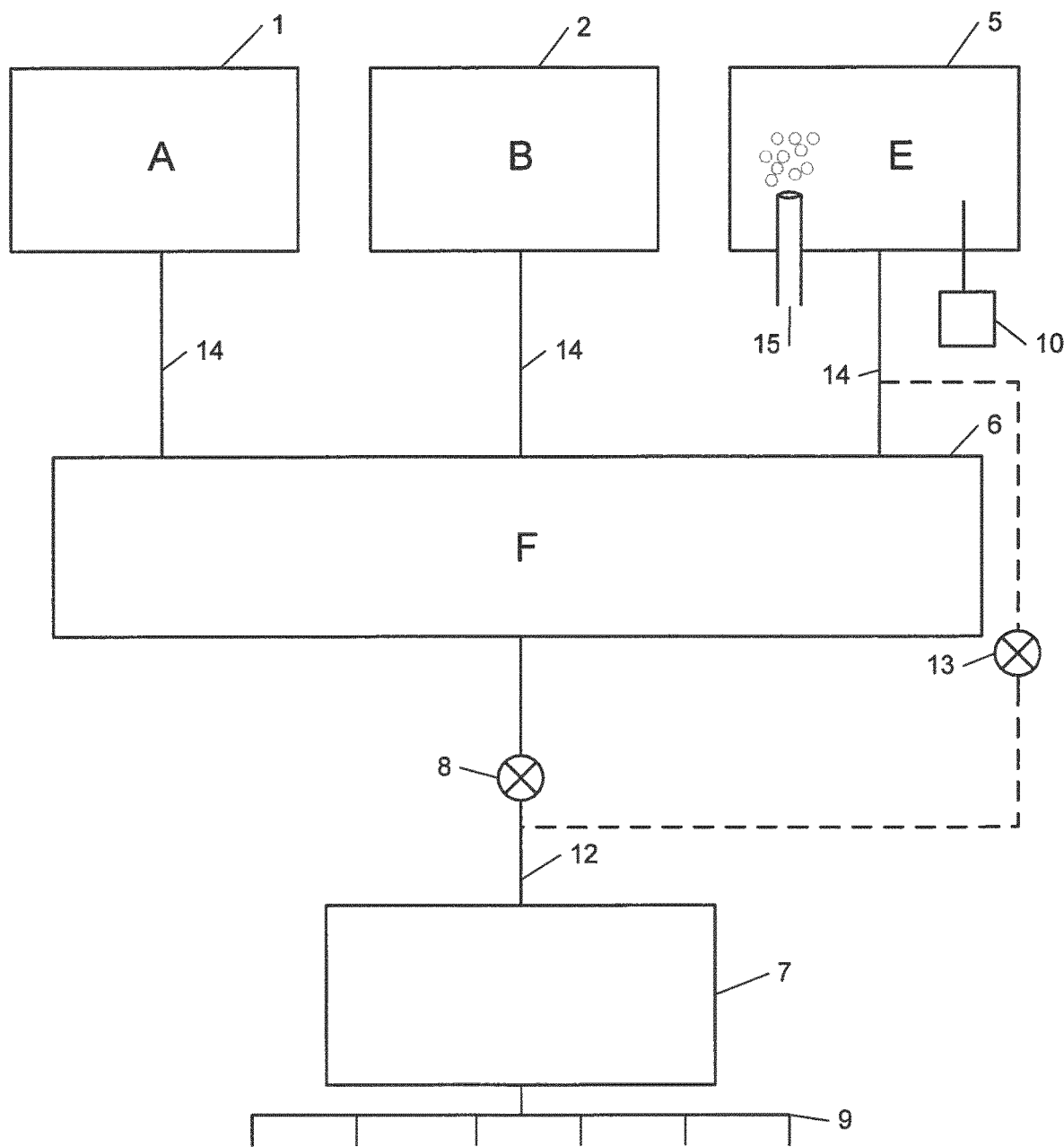
FIG. 4 depicts schematically a form of implementation of the fourth embodiment of the device and method according to the present invention.

In a fourth preferred embodiment of the method according to the present invention illustrated in FIG. 4, said series of mother solutions comprises a first mother solution A in a first mother solution vessel 1, a second mother solution B in a second mother solution vessel 2 and a third mother solution E in a third mother solution vessel 5. The first mother solution A comprises calcic nutriments, preferably in the form of nitrate or chloride, the second mother solution B comprises sulphate and phosphate anions and mixtures thereof and said third mother solution E comprises iron and at least one polyphosphate; the magnesian nutriments being able to be supplied in said mother solution A or in said second mother solution B; said third mother solution E being said solution D (E=D) of iron and at least one polyphosphate having a pH of between 4.5 and 6.2, advantageously greater than or equal to 5.0 and less than or equal to 6.0, preferably greater than 5.5, by adjustment thereof by means of acid.

In this embodiment, a third mother solution E comprising iron and at least one polyphosphate is formed separately (such as for example in a third mother solution vessel 5 or from mother presolutions (not illustrated) supplied in the third mother solution vessel 5). It is then supplied not in the second mother solution B but directly in the fertirrigation solution F, in the dilution tank 6 or in the irrigation line 12, by means for example of its own transfer device 13. However, in this embodiment, the pH will be adjusted to a value between 4.5 and 6.2, advantageously greater than or equal to 5.0 and less than or equal to 6.0, preferably greater than 5.5, by the pH adjustment means 10 connected to the third vessel 5, in particular by adding acid in the third mother solution E. Although this embodiment requires two additional appliances in terms of equipment, a vessel 5 for preparing a third mother solution E and an additional system 13 or 14 for metering this solution in the dilution vessel 6 or in the irrigation line 8, it is nevertheless less constraining from a chemical point of view. In particular the magnesian nutriments can be added in the form of sulphates or nitrates in said second mother solution B.

The various mother solutions or mother presolutions of the aforementioned embodiments are transferred from one vessel to another by means of any conventional solution transfer system (11, 14, 8, 13) such as pumps, venturi, gravity, etc.

In an advantageous embodiment of the invention, each step of supplying each of the mother solutions (A, B, E) of the aforementioned embodiments, in a dilution vessel 6 or in an irrigation line 12, is a step of transfer by venturi entrainment of said mother solution by means of a flow of fertirrigation solution diverted at the discharge of said transfer device 8, which makes it possible to supply the fertirrigation device 7 (not illustrated).

All the steps of the method, whatever the embodiment envisaged, are performed at ambient temperature, that is to say without strict temperature control in the vessels of said mother solutions or of said mother presolutions, that is to say at temperatures fluctuating between 10° and 40° C. depending on whether the preparation installation is installed in the open air or in a greenhouse.

Advantageously, in the present invention, for example in the embodiments 1, 2, 3 or 4, oxidation of the mother solutions or mother presolutions can be envisaged by oxidation means 15, in particular in order to prevent the precipitation or coprecipitation of certain micronutriments such as copper. This is because, in the absence of oxidation, micronutriments such as copper may precipitate with iron or other ions such as pyrophosphates. Conventional oxidation techniques can be implemented with known oxidants such as oxygen, air, hydrogen peroxide, Javel water, etc.

By way of example, the oxidation treatments normally used are: bubbling with air by means of a disperser situated at the bottom of the vessel (the air being able to come from a compressor or a simple pump), agitation on the surface of the liquid under air, etc.

The duration of oxidation treatment varies between a few hours and several days depending on the size of the vessel and the aeration system used.

Advantageously, whatever the embodiment 1, 2, 3 or 4, a second pH adjustment means 10 may be present in the dilution tank 6 (not illustrated).

Figure 5:
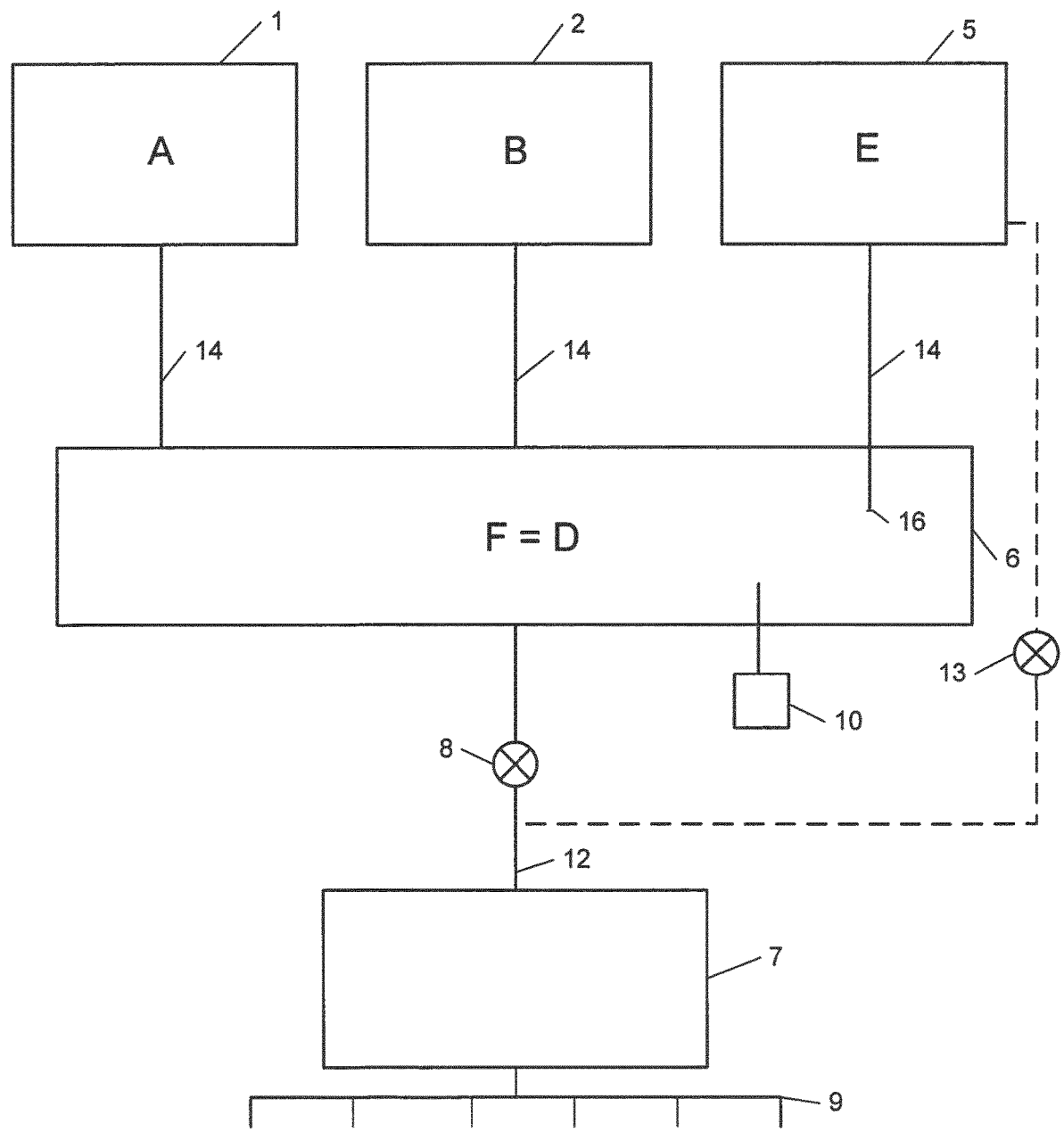
FIG. 5 depicts schematically a form of implementation of the fifth embodiment of the device and method according to the present invention.

In a fifth embodiment of the method according to the present invention illustrated in FIG. 5, said series of mother solutions comprises a first mother solution A contained in a first mother solution vessel 1, a second mother solution B contained in a second mother solution vessel 2 and a third mother solution E contained in a third mother solution vessel 5. The first mother solution A comprises calcic nutriments, preferably in the form of nitrate or chloride, the second mother solution B comprises sulphate and phosphate anions and said third mother solution E comprises iron and at least one polyphosphate; magnesian nutriments being able to be supplied in said first A or said second mother solution B; the mixing conditions being sufficiently intensive at the point of supply of said third mother solution E in said fertirrigation solution F so as to prevent any precipitation of calcium phosphate; said fertirrigation solution F being at a pH below 6.2, preferably below 6.0 and preferentially below 5.8 after said supply of the third mother solution E.

In this embodiment, a mother solution E comprising iron and at least one polyphosphate is formed separately. This may have a basic pH and is supplied directly in the fertirrigation solution F, in the dilution system 6 or in the irrigation line 12 to which the pH adjustment means 10 are connected (which also comprise, in this particular embodiment, the means that make it possible to ensure sufficiently intensive mixing conditions at the point 16 of supply of said third mother solution E in said fertirrigation solution F). Advantageously, in the fifth embodiment, the mixing conditions may be provided by any conventional agitation means at the point of injection of said third mother solution E, such as agitators, recycling, gas bubbling, etc.

However, in this embodiment, the sufficient quantity of acid will be added before supply of said third solution E in the dilution device (dilution tank 6 or irrigation line 12).

In this particular embodiment, the fertirrigation solution F is the solution D of iron and at least one polyphosphate in the required pH range, that is to say 4.5 and 6.2, more particularly between 5.0 and 6.0, preferably greater than 5.5, but less than or equal to 5.8.

For example, in a variant, said series of mother solution vessels comprises a first mother solution vessel, a second mother solution vessel and a third mother solution vessel, said means for supplying iron and at least one polyphosphate being connected to said third vessel, said pH adjustment means 10 being connected to said dilution system or to one of said first or second mother solution vessels.

Naturally the present invention is in no way limited to the embodiments described above and many modifications can be made thereto without departing from the scope of the accompanying claims.

EXAMPLES

The use of mineral nutritive compositions based on iron and at least one polyphosphate was tested in various fertirrigation methods, the examples most representative of the present invention and of the problem that they made it possible to solve being set out below.

Test Operating Method

The fertirrigation solution is formed continuously in a conventional 1000 litre dilution tank that the irrigation water passes through. The addition of nutritive elements in said dilution tank takes place via three different mother solutions, one of them containing the source of iron and polyphosphate, and other two all the remaining nutritive elements.

Comparative Example 1

The mother solution containing iron and at least one polyphosphate is that of example 1 of the patent application WO2014/056688. This solution, with an Fe content of 10 mmol/kg, is characterised by a basic pH of 9.4, in which no precipitate appears after 4 weeks of storage at ambient temperature or higher temperature (40° C.).

Each of the mother solutions is metered by means of a specific venturi system, a small fraction of the fertirrigation solution being taken off at the discharge from the irrigation pump in order to serve as a drive liquid for each venturi. The pH of the fertirrigation solution is moreover adjusted continuously between pH 5.4 and 5.7 by an automatic addition of nitric acid carried out directly in the dilution tank. A severe precipitation problem appears at the outlet of the venturi used for metering the mother solution containing iron and at least one phosphate after a few hours of operation.

The solid particles thus formed are deposited partly on the walls of the tube and end up by completely closing off the passage. Furthermore, the solid precipitate of calcium orthophosphate giving rise to this fouling entrains a large proportion of the iron by chemical coprecipitation. This may be the cause of a serious iron deficiency in the plants cultivated if the abnormality is not detected sufficiently quickly. According to the analysis of the fertirrigation solution taken off dropwise, the loss of iron resulting before the blocking of the venturi was already at least 20% compared with the calculation of theoretical concentration of iron that should have been present in the fertirrigation solution. This theoretical value was correctly reached by a dilute solution prepared in the same proportions in the laboratory in order to simulate the method.

Comparative Example 2

A variant of comparative example 1 was implemented by replacing the venturi system dedicated to the mother solution containing iron and at least one polyphosphate by a volumetric metering pump. In this case, said mother solution containing iron and at least one polyphosphate therefore ends up directly in the dilution tank without being partially diluted by the fertirrigation solution in the transfer system. During this second test, the yield of iron obtained dropwise was particularly non-reproducible, losses of 40% being observed at times.

Comparative Example 3

In a second variant of comparative example 1, the mother solution containing iron and at least one polyphosphate is raised to a pH of 7.0 by adding nitric acid before use thereof by the venturi metering system, the other operating conditions being identical to those of comparative example 1. As in comparative example 1, the stability of the mother solution is satisfactory: no precipitate being observed after 4 weeks of storage at ambient temperature or during storage at a temperature of 40° C. Such acidification of the mother solution does however not suffice to prevent the blocking of the venturi after a few hours.

Comparative Example 4

A variant of comparative example 3 was implemented by increasing the degree of acidification of the mother solution containing iron and at least one polyphosphate to pH 4.0. A precipitate then appears in said mother solution containing iron and at least one polyphosphate after a few days. Analyses of the mother solution containing iron and at least one polyphosphate when filtered made it possible to measure the proportion of iron remaining in solution. The results reveal significant losses of iron in the mother solution containing iron and at least one polyphosphate that reach respectively 20% and 55% after 1 and 4 weeks of storage at ambient temperature.

Example 1

During this test, the mother solution containing iron and at least one polyphosphate according to example 1 of the patent application WO2014/056688 was acidified by means of nitric acid in order to achieve a pH of 6.0 before use thereof via a transfer system of the venturi type in the dilution tank. The results thus obtained are satisfactory from all points of view: the problem of fouling at the outlet of the venturi disappeared and the soluble iron content of the fertirrigation solution taken off dropwise is continuously equal to the calculated value to within any analysis errors. Finally, the mother solution containing iron and at least one polyphosphate is stable: no loss of iron by chemical precipitation over 4 weeks of storage at ambient temperature or at a temperature of 40° C.

Example 2

Example 1 was reproduced replacing the transfer system of example 1 with a volumetric pump. The yield of iron dropwise always greatly exceeds 90%.

Example 3

Example 1 was reproduced by acidifying the mother solution containing iron and at least one polyphosphate to pH 5.0. The stability under storage of the mother solution is maintained up to 4 weeks at ambient temperature.

The invention claimed is:

1. A method for the fertirrigation of plants, comprising
   making available a series of mother solutions comprising at least one mother solution comprising iron and at least one polyphosphate at a basic pH or at a pH of between 4.5 and 6.2, having a concentration of iron of 0.15 mM to 500 mM and formed by adding iron and at least one polyphosphate to an aqueous phase,
   feeding each of the mother solutions into a dilution system, in order to form a fertirrigation solution, and
   supplying a fertirrigation device by means of a transfer device, and supplying said fertirrigation device with said fertirrigation solution,
   with the proviso that if said mother solution is at a basic pH, a sufficient quantity of acid is added in said dilution system prior to feeding said mother solution and sufficiently intensive mixing conditions are provided at a feed point of said mother solution in said dilution system so that said fertirrigation solution has a pH below 6.2.

2. The plant fertirrigation method according to claim 1, wherein one of said at least one solution of iron and at least one polyphosphate at a pH of between 4.5 and 6.2 is the fertirrigation solution.

3. The plant fertirrigation method according to claim 1, wherein said addition of iron and at least one polyphosphate is implemented by supplying, separately or together, a source of iron and a source of at least one polyphosphate, each source being, independently of each other, in the form of a solid, solution or suspension.

4. The plant fertirrigation method according to claim 1 wherein said at least one addition of iron and at least one polyphosphate to an aqueous phase with formation of at least one solution of iron and at least one polyphosphate at a pH of between 4.5 and 6.2 is an addition of a mother presolution of iron and at least one polyphosphate to a mother solution, which forms the solution of iron and at least one polyphosphate at a pH of between 4.5 and 6.2.

5. The plant fertirrigation method according to claim 1, wherein said at least one solution of iron and at least one polyphosphate at a pH of between 4.5 and 6.2 is a mother presolution of iron and at least one polyphosphate at a pH of between 4.5 and 6.2 added to at least one mother solution of said series of mother solutions.

6. The plant fertirrigation method according to claim 1, wherein said addition of iron and at least one polyphosphate is implemented by supplying a composition containing iron and at least one polyphosphate, in solid, solution or suspension form.

7. The plant fertirrigation method according to claim 1, wherein said at least one mother solution comprising iron and at least one polyphosphate also contains ions selected from the group consisting of sulphates, phosphates, nitrates, chlorides, potassium, sodium, ammonium and mixtures thereof.

8. The plant fertirrigation method according to claim 1, wherein said at least one mother solution comprising iron and at least one polyphosphate contains micronutriments selected from the group consisting of boron, manganese, zinc, copper, molybdenum, cobalt and mixtures thereof.

9. The plant fertirrigation method claim 4, wherein the pH of said mother presolution or of one of said mother solutions or of said fertirrigation solution is adjusted by adding a mineral acid.

10. The plant fertirrigation method according to claim 1, further comprising oxidation of said mother solution containing iron and at least one polyphosphate.

11. The plant fertirrigation method according to claim 1, wherein the iron and said at least one polyphosphate are added in a $P_poi_y/Fe$ ratio of between 5 and 50, where Fe represents the total number of moles of iron and $P_poi_y$ represents the number of moles of phosphorus in polyphosphate form.

12. The plant fertirrigation method according to claim 1, wherein said at least one polyphosphate comprises potassium tripolyphosphate, tetrapotassium pyrophosphate, potassium tripolyphosphate, sodium tripolyphosphate, sodium acid pyrophosphate, tetrasodium pyrophosphate ammonium pyrophosphate, and/or ammonium polyphosphate or mixtures thereof.

13. The plant fertirrigation method according to claim 1, wherein said fertirrigation solution is at a pH below 6.

14. The plant fertirrigation method according to claim 1, wherein the iron and said at least one polyphosphate are added in said fertirrigation solution at a supply point having mixing conditions that are sufficiently intense with a view to avoiding any precipitation.

15. The plant fertirrigation method according to claim 4, wherein said mother presolution containing iron and at least one polyphosphate contains micronutriments selected from the group consisting of boron, manganese, zinc, copper, molybdenum, cobalt and mixtures thereof.

16. The plant fertirrigation method according to claim 4, further comprising oxidation of said mother presolution containing iron and at least one polyphosphate.

* * * * *